May 2, 1939.  G. C. KRAUSE  2,156,729
CULTIVATOR DRAG
Filed June 25, 1938
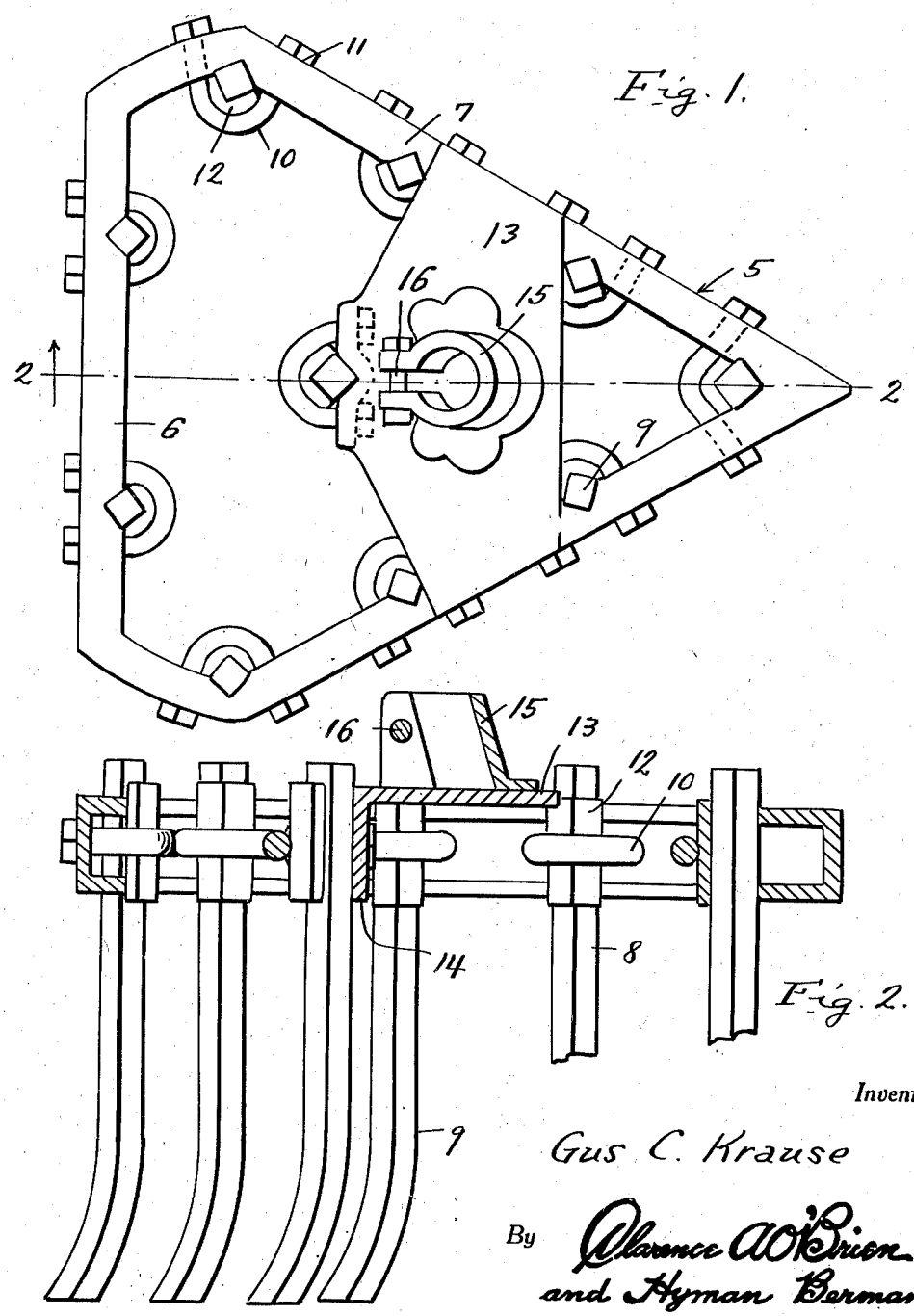
Inventor
Gus C. Krause
By Clarence A. O'Brien
and Hyman Berman
Attorneys Patented May 2, 1939

2,156,729

UNITED STATES PATENT OFFICE 2,156,729

CULTIVATOR DRAG

Gus C. Krause, Lake Benton, Minn.

Application June 25, 1938, Serial No. 215,888

1 Claim. (Cl. 97—8)

This invention relates to cultivator drags to be used on any type of cultivator in lieu of the usual cultivator shovels and has for the primary object the provision of an efficient and inexpensive device of this character which will lightly cultivate the soil between and adjacent to growing vegetation for stimulating the growth thereof and for destroying weeds and other undesirable growth tending to hinder the growing of the desired vegetation and may be easily and quickly secured on a cultivator arm or beam to which the cultivator shovel is usually attached.

With these and other objects in view, the invention consists in certain novel features of construction, combination and arrangement of parts to be hereinafter more fully described and claimed.

For a complete understanding of my invention, reference is to be had to the following description and accompanying drawing, in which:

Figure 1 is a top plan view illustrating a cultivator drag constructed in accordance with my invention.

Figure 2 is a sectional view taken on the line 2—2 of Figure 1.

Referring in detail to the drawing, the numeral 5 indicates a substantially triangular shaped frame constructed from channeled material having the channels opening inwardly of said frame, as clearly shown in Figure 2. The frame 5 being substantially triangular provides a cross member 6 and converging side members 7. The members 6 and 7 and upon the inside of the frame 5 are provided with spaced notches having angularly related walls to receive the shank portions 8 of teeth 9. The shanks of the teeth are of substantially rectangular shape in cross section. The members 6 and 7 adjacent the notches are also provided with apertures to receive substantially U-shaped clamps 10 on which are threaded nuts 11. The clamps 10 have formed thereon saddles 12 having angularly related faces to cooperate with the angularly related faces or walls of the notches in firmly securing the shanks of the teeth on the frame 5. The teeth are arranged on the frame so that they will not track each other.

The teeth on the forward faces thereof have cutting edges and said teeth gradually curve in a rearward direction towards their free ends, as clearly shown in Figure 2.

A plate 13 is secured on the top faces of the side members 7 of the frame and has a depending flange 14 apertured to receive a U-shaped clamp of a similar character to the clamps 10 and is notched to receive a tooth to permit the clamp carried by said flange to secure thereto a tooth.

Formed on the plate 13 is a split sleeve 15 to receive a cultivator beam or arm and is equipped with a bolt 16 for contracting the sleeve to bring about gripping thereof on the cultivator arm or beam thereby effectively securing the device onto a cultivator.

By referring to Figure 1 it will be seen that one of the teeth is applied to the frame 5 at the apex thereof and the clamp employed for securing the latter-named tooth on the frame is of substantially V-shape so that it may extend through apertures provided in the side members 5 adjacent to where said side members join with each other.

It is believed that the foregoing description, when taken in connection with the drawing will fully set forth the construction and advantages of this invention to those skilled in the art to which such devices relate, so that further detailed description will not be required.

What I claim is:

A cultivator comprising a substantially triangular shaped frame including a cross member and converging side members integral therewith and integrally connected with each other, said side and cross members being constructed of channel material with the channels opening inwardly of the frame, said cross and side members having notches and apertures and the notches having angularly related faces, teeth including shanks having angularly related faces received in said notches, clamps extending through the apertures and having nuts threaded thereon and passing about the shanks of the teeth, saddles carried by the clamps and having angularly related faces to coact with the angularly related faces of the notches and the angularly related faces of the shanks in securing the teeth against movement on the frame, a plate secured on the side members and having a notch provided with angularly related faces, a tooth having a shank provided with angularly related faces engaging the angularly related faces of the last-named notch, a clamp carried by said plate and including a saddle having angularly related faces to engage the shank of the last-named tooth, a split sleeve formed on said plate for attaching the frame onto a cultivator, a tooth including a shank having angularly related faces engaging the side members where the latter join with each other, and a substantially V-shaped clamp connecting the side members and including a saddle having angularly related faces to engage the angularly related faces of the shank of the last-named tooth.

GUS C. KRAUSE.